Sept. 4, 1962
L. E. GREENLAW
3,052,490
CONDUIT FITTING HAVING A RADIALLY SWINGABLE
END LOCKING PORTION
Filed Feb. 2, 1959
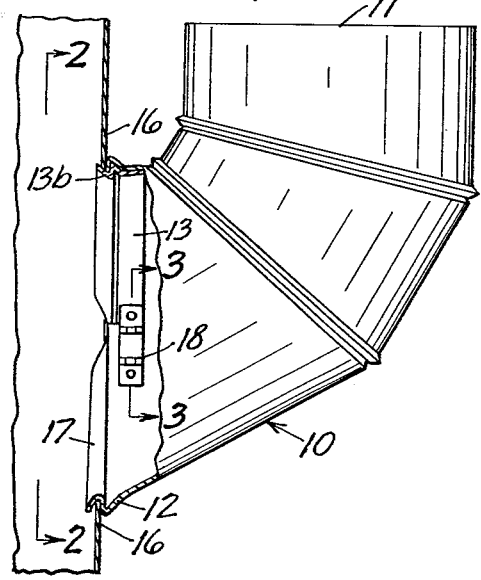
FIG. 1
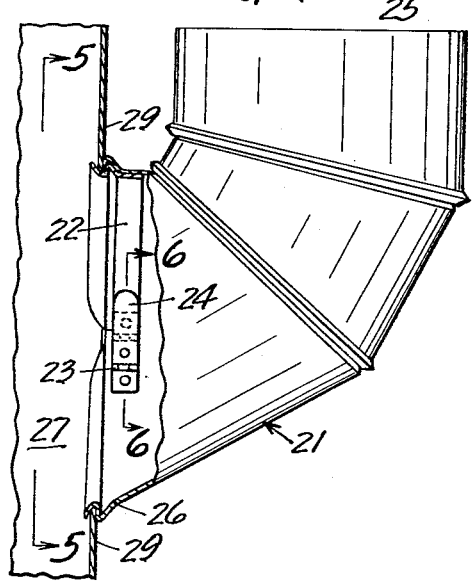
FIG. 4
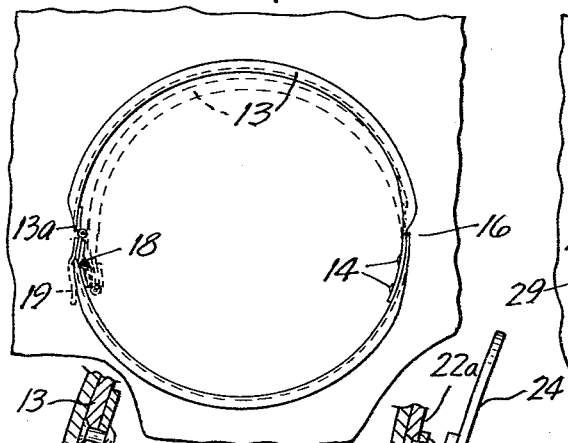
FIG. 2
FIG. 3
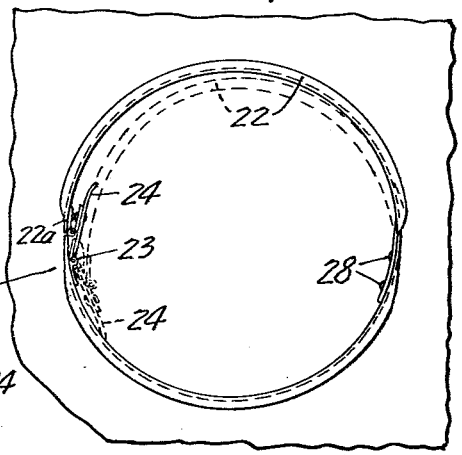
FIG. 5
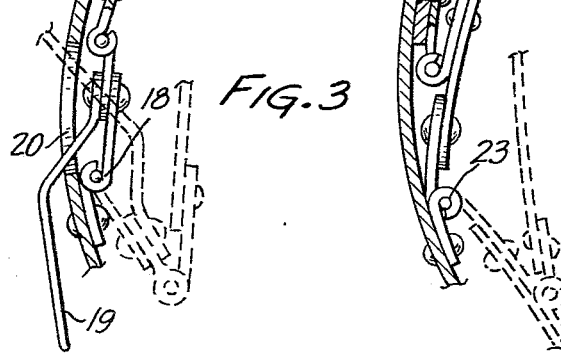
FIG. 6
INVENTOR
LYLE E. GREENLAW
BY
Williamson, Schroeder & Palmatier
ATTORNEYS

United States Patent Office 3,052,490
Patented Sept. 4, 1962

3,052,490
CONDUIT FITTING HAVING A RADIALLY SWING-ABLE END LOCKING PORTION
Lyle E. Greenlaw, Detroit Lakes, Minn., assignor to Snappy, Inc., Detroit Lakes, Minn., a corporation of Minnesota
Filed Feb. 2, 1959, Ser. No. 790,517
12 Claims. (Cl. 285—189)

This invention relates to conduit fittings. More particularly, it relates to a fitting designed to effect and facilitate the connection of a conduit to a plenum chamber which has an opening formed in one wall thereof for that purpose.

In the installation of certain types of heating units in houses, as in many other instances, it is often necessary and desirable to connect a tubular member to a panel having an opening formed therein. In the case of the installation of a heating unit, this generally requires considerable time and inconvenience in order to satisfactorily connect a tubular member to a plenum chamber having a wall within which an opening is formed for that purpose. Considerable time and inconvenience are generally involved because a reasonably tight seal might be attained and the seal must be accomplished in a relatively inaccessible location because one must work from outside the plenum chamber and often through the interior of the heat conduit which is the tubular member referred to. My invention is designed toward eliminating these disadvantages and toward providing a quick and ready means for connecting or disconnecting a heat conduit to such a plenum chamber.

It is a general object of my invention to provide a novel and improved device for securing a tubular member within an opening of a panel member, the device being of simple and inexpensive construction and operation.

A more specific object is to provide a novel and improved conduit fitting for securing a conduit within an opening of a panel member, the device being constructed so as to enable the user to effect the connection very quickly, easily, and in an inexpensive manner.

Another object is to provide a novel conduit fitting for securing a tubular member within an opening of a panel member, the use of which will substantially reduce the amount of time required and the inconvenience normally experienced in making such connections.

Another object is to provide a novel conduit fitting for securing a conduit within an opening of a panel member which not only will readily be connected to such a panel member but which will also automatically lock in place against any possible detachment.

Another object is to provide a simple and improved conduit fitting for securing a conduit within an opening of a panel member, the fitting being so constructed and arranged that it may be simply and readily locked in desired connecting position and may be just as simply and readily unlocked with little effort or inconvenience and at no cost.

Another object is to provide a simple and inexpensive conduit fitting for securing a conduit within an opening of a panel member, the fitting being so constructed and arranged as to automatically lock in connected position when moved to that position and capable of being easily and quickly returned to unlocked position by manipulating a control lever positioned exteriorly of the conduit.

Another object is to provide a simple and inexpensive conduit fitting for securing a conduit within an opening of a panel member, the fitting being constructed and arranged so as to greatly reduce installation and maintenance cost of a heating installation.

Another object is to provide a simple and inexpensive conduit fitting constructed and arranged to automatically lock in either locked or unlocked positions depending upon which position the device is moved to by means of a control element.

These and other objects and advantages of the invention will more fully appear from the following description made in connection with the accompanying drawings, wherein like reference characters refer to the same or similar parts throughout the several views, and in which:

FIG. 1 is a side elevational view of one embodiment of my invention positioned within the opening of and attached to a plenum chamber wall, with portions of the view broken away to better illustrate the construction thereof;

FIG. 2 is an elevational view taken along line 2—2 of FIG. 1;

FIG. 3 is a fragmentary sectional view on enlarged scale taken along line 3—3 of FIG. 1;

FIG. 4 is a side elevational view of a second embodiment of my invention positioned within the opening of and secured to a plenum chamber wall, with portions thereof broken away to better illustrate the construction thereof;

FIG. 5 is an elevational view taken along approximately line 5—5 of FIG. 4; and

FIG. 6 is a fragmentary sectional view on enlarged scale taken along line 6—6 of FIG. 4.

One embodiment of my invention, as shown in FIGS. 1-3, includes a tubular member indicated generally by the numeral 10 having open ends, one 11 of which is adapted to be connected to a hot air conduit in the usual manner well known in the art and the other 12 of which has a flexible resilient collar member 13 fixedly secured thereto by any suitable means as rivets 14. As shown in FIGS. 1-3, this collar member 13 normally extends along the inner circumference of the tubular member 10 and has an end portion 13a which is swingable radially inwardly of the tubular member 10. As best shown in FIG. 1, the collar member 13 extends axially outwardly from the tubular member 10 and has plenum-chamber-wall-engaging means consisting of a radially outwardly extending flange 13b which normally extends outwardly beyond the radial confines of the opening-defining portions of the tubular mmeber 10 so that the flange 13b will engage the opening-defining portions 16 of the plenum chamber wall to positively secure the tubular member to that wall. The end portion 12 of the tubular member 10 carries cooperating plenum-chamber-wall-engaging means in the form of an outwardly extending flange 17 as best shown in FIG. 1, this flange being positioned opposite the plenum-chamber-wall-engaging means of the collar 13 and cooperating therewith to positively secure the tubular member 10 to the opening-defining portions 16 of the plenum chamber wall.

It will be noted that the collar member 13 is secured to the tubular member 10 by the rivets 14 at a point substantially distant from the end portion 13a which must swing radially inwardly. The resilient nature of the collar 13 tends to continuously urge the end portion 13a radially outwardly so as to register with and extend along the inner circumference of the tubular member 10.

The free end portion 13a is pivotally connected by a hinge element 18 to the end portion 12 of the tubular member 10. A control element 19 is fixedly secured to the hinge element 18 and extends outwardly therefrom through a small opening 20 provided for that purpose in the end portion 12 of the tubular member 10. The rigid control element 19 together with the hinge element 18 to which it is fixedly secured constitutes a lever member of the first class type, for manipulation of the element 19 may cause the hinge 18 to swing between the two extreme positions shown in FIG. 2, in one of which the end portion 13a is disposed radially inwardly at a non-engaging position relative to the opening-defining portions 16 of the plenum chamber wall, and at the other of which the end portion 13a is disposed in plenum-chamber-wall-engaging position as shown in solid lines in FIG. 2.

The resiliency of the collar member 13, the fact that it is fixedly secured to the tubular member 10 by the rivets 14, and the hinge element 18 pivotally connecting the end portion 13a to the tubular member 10 at a relatively remote point together gives the collar member 13 and the hinge 18 an over-center action. For example, when the control element 19 is swung toward the dotted line position from the broken line position shown in FIG. 3, the collar member 13 will resist such movement until the hinge 18 extends substantially radially relative to the arc defined by the collar element 13 and when moved beyond that position the collar member 13 will cause the hinge 18 to snap to the broken line position. Similarly, when the element 19 is moved from the broken line position toward the solid line position shown in FIG. 3, the collar 13 will resist such movement until the hinge element 18 reaches a position substantially radial to the arc defined by the collar 13 and thereafter the hinge 18 will cause the hinge 18 to snap into the solid line position shown in FIG. 3. Thus, my conduit fitting has an over-center automatic locking action in both of its engaging and non-engaging positions.

It is an extremely simple matter to attach my conduit fitting to the opening defining portions 16 of a plenum chamber wall. To do so, the collar 13 is swung to the broken line position shown in FIGS. 2–3 by throwing the control element 19 to the broken line position of FIG. 3. The end portion 12 of the tubular member 10 is then inserted within the opening of the opening-defining portions 16 of the plenum chamber wall so that the flange 17 will engage the inner surface thereof and so that the collar 13 is disposed radially inwardly of the opposite opening-defining portions 16 of the plenum chamber wall. The control element 19 is then snapped from the broken line position shown in FIG. 3 to the solid line position and in doing so, the collar 13 will snap into engaging position as shown in FIG. 1 with the result that the conduit fitting is rigidly secured to the plenum chamber wall without requiring any additional effort or attention. From this it can be seen that in addition to this heat conduit fitting being extremely simple and inexpensive to manufacture, it greatly reduces the amount of time, effort and inconvenience in securing a heat conduit to a plenum chamber wall.

An additional advantage of this form of my invention is the fact that the tubular member 10 can be disconnected at will from the opening-defining portions 16 of the plenum chamber wall with a minimum of effort and inconvenience. To accomplish this, the control element 19 is merely snapped from the solid line position shown in FIG. 3 to the broken line position and this causes the collar member 13 to move to the broken line positions of FIGS. 2 and 3. The tubular member 10 is then tipped slightly downwardly as viewed in FIG. 1, causing the collar member 13 to move clear of the opening-defining portions 16 and the tubular member 10 may be then lifted slightly so that the flange 17 will no longer engage the opening-defining portions 16 of the plenum chamber wall. Thus, it can be seen that this conduit fitting can be readily attached to or detached from the plenum chamber wall with an absolute minimum of effort and inconvenience. In addition, the engaging collar 13 is positively locked in either engaging or non-engaging position, as desired.

The second embodiment of my invention as shown in FIGS. 4–6 includes a tubular member indicated generally by the numeral 21, a collar 22, a hinge member 23, and a control element 24. The tubular member 21 is open ended and the entire construction is much like that shown in FIGS. 1–3, except for the fact that the hinge 23 and the control element 24 together constitute a lever of the second class type, in that the control element 24 which is rigidly secured to the hinge 23 is connected to the opposite end of the hinge element as compared to the construction shown in FIGS. 1–3. As a result, the entire hinge 23 and control element 24 are disposed within the interior of the conduit 21 at all times. This construction however, has the same over-center action as described with respect to the construction shown in FIGS. 1–3, but the control element 24 is not accessible from the exterior of the conduit 21. The conduit 21 has an end 25 adapted to be connected to a heating conduit and it has an opposite end portion 26 which carries plenum-chamber-wall-engaging means 27 identical in construction to that shown in FIG. 1. The collar 22 is fixedly secured to the conduit 21 by rivets 28 and the free end portion 22a of the collar swings inwardly in the same manner as the end portion 13a of the collar 13. The collar 22 is identical in construction with the collar 13 and functions in the same manner. The entire device shown in FIGS. 4–6 may be connected and disconnected to the opening-defining portions 29 of the plenum chamber wall in the same manner as the construction shown in FIGS. 1–3 with the exception that the collar 13 must be moved between engaging and non-engaging positions by manipulation of the control element 24 from a position within the confines of the conduit 21.

From the above it can be seen that I have provided an extremely simple, inexpensive, and yet highly effective conduit fitting which enables a user to readily attach or detach a heating conduit to opening-defining portions of a plenum chamber wall. This fitting is so constructed as to automatically lock the fitting in engaging or non-engaging position as desired through the simple manipulation of a small control element. The entire construction can be manufactured very inexpensively and hence sold to the public at a cost substantially less than the means heretofore used for connecting conduits to opening-defining portions of a plenum chamber wall.

It will be understood of course, that in lieu of the plenum-wall-engaging means 17 of the tubular member, the collar 13 could extend substantially around the entire inner circumference of the tubular member. Such a construction would undoubtedly provide the necessary seal although it would not function in such a satisfactory manner, for it would be likely to be quite loose when in collapsed position and would flop around while the collar is being slipped into plenum wall engaging position. Thus, although it could function it would not be as desirable as the construction shown in the drawings.

It will, of course, be understood that various changes may be made in the form, details, arrangement and proportions of the various parts without departing from the scope of my invention.

What is claimed is:

1. A conduit fitting for connecting a conduit to opening-defining portions of a plenum chamber wall, said fitting comprising a tubular member having open ends one of which is adapted to be connected to a hot air conduit, a collar element secured to the other end of said member and having a free end portion swingable radially inwardly relative to said member, said collar element extending along said member circumferentially, a radially extending flange carried by said collar element and normally extending outwardly therefrom beyond the radial confines of said member, to engage the opening-defining portions of a plenum chamber wall, and a rigid lever pivotally connected at spaced points along its length to said tubular member and said free end portion of said collar, the axes of pivot of said lever extending longitudinally of said tubular member, said lever having portions thereof movable radially inwardly about its axis of pivot on said tubular member and in so doing moving said free end portion of said collar and said flange simultaneously therewith to a radially inwardly disposed position, said portions being movable radially outwardly from said position to a locking and circumferentially extending position relative to said tubular member and in so doing moving said free end portion and said flange radially outwardly to plenum-chamber-wall-engaging position.

2. The structure defined in claim 1 wherein said lever extends from its point of pivot on said collar element in a direction away from its point of pivot on said tubular member.

3. The structure defined in claim 1 wherein said lever is a second class lever.

4. The structure defined in claim 1 wherein said lever is a first class lever.

5. The structure defined in claim 1 wherein the radially inwardly movable portions of said lever member move to an over-dead-center position to lock said collar element in plenum-chamber-wall-engaging position.

6. The structure defined in claim 1 wherein said collar is rigidly secured to the inside surface of said open end of said tubular member and said lever is pivotally secured to the inner surface of said end of said tubular member.

7. The structure defined in claim 1 wherein said lever when in locking position extends along said free end portion of said collar element and circumferentially of said tubular member.

8. The structure defined in claim 1 wherein said lever when in locking position extends away from said free end portion of said collar element and circumferentially of said tubular member.

9. A conduit fitting for connecting a conduit to opening-defining portions of a plenum chamber wall, said fitting comprising a tubular member having open ends one of which is adapted to be connected to a hot air conduit, a collar element secured to the other end of said member and having a free end portion swingable radially inwardly relative to said member, said collar element extending along said member circumferentially, plenum-chamber-wall-engaging means carried by said collar element and constructed and arranged to engage the opening-defining portion of a plenum chamber wall, cooperating plenum-chamber-wall-engaging means carried by said other end portion of said tubular member in opposed relation to said first mentioned plenum-chamber-wall-engaging means, and a rigid hinge member pivotally connected directly to said tubular member and to said free end portion of said collar, the axes of pivot of said hinge member extending longitudinally of said tubular member, said hinge member having portions thereof movable radially inwardly about its axis of pivot on said tubular member and in so doing moving said free end portion of said collar simultaneously therewith to a radially inwardly disposed position, said portions being movable radially outwardly from said position to a locking and circumferentially extending position relative to said tubular member and in so doing, moving said collar element free end portion and its plenum-chamber-wall-engaging means radially outwardly to plenum-chamber-wall-engaging position.

10. The structure defined in claim 9 wherein said collars plenum-chamber-wall engaging means normally extends radially outwardly from said collar element to a position beyond the radial confines of said tubular member.

11. The structure defined in claim 9 and a control element fixedly secured to said hinge member and extending outwardly therefrom and together constituting a lever whereby the position of said collar element may be manipulated.

12. A conduit fitting for connecting a conduit to opening-defining portions of a plenum chamber wall, said fitting comprising a tubular member having open ends one of which is adapted to be connected to a hot air conduit, a collar element secured to the other end of said member and having a free end portion swingable radially inwardly relative to said member, said collar element extending along said member circumferentially, a radially extending flange carried by said collar element and normally extending outwardly therefrom beyond the radial confines of said member, to engage the opening-defining portions of a plenum chamber wall, and a lever pivotally connected at spaced points along its length to said tubular member and said free end portion of said collar, said lever having portions thereof movable radially inwardly about its axis of pivot on said tubular member and in so doing moving said free end portion of said collar and said flange simultaneously therewith to a radially inwardly disposed position, said portions being movable radially outwardly from said position to a locking and circumferentially extending position relative to said tubular member and in so doing moving said free end portion and said flange radially outwardly to plenum-chamber-wall-engaging position, said tubular member having an opening formed therethrough adjacent said lever member and said lever extending outwardly through said opening in said tubular member.

References Cited in the file of this patent

UNITED STATES PATENTS

| | | |
|---|---|---|
| 268,646 | Eckel | Dec. 5, 1882 |
| 1,191,988 | Oldham | July 25, 1916 |
| 2,289,422 | Grotnes | July 14, 1942 |
| 2,864,638 | Nelson | Dec. 16, 1958 |
| 2,880,017 | Anderson | Mar. 31, 1959 |